United States Patent
Takasaki et al.

(10) Patent No.: US 11,127,962 B2
(45) Date of Patent: Sep. 21, 2021

(54) FUEL CELL SYSTEM AND FUEL CELL VEHICLE

(71) Applicant: TOYOTA JIDOSHA KABUSHIKI KAISHA, Toyota (JP)

(72) Inventors: Fumiaki Takasaki, Toyota (JP); Hirofumi Kanazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 16/408,598

(22) Filed: May 10, 2019

(65) Prior Publication Data

US 2019/0386324 A1 Dec. 19, 2019

(30) Foreign Application Priority Data

Jun. 19, 2018 (JP) .............................. JP2018-116335

(51) Int. Cl.

| | |
|---|---|
| *H01M 8/04746* | (2016.01) |
| *H01M 8/04029* | (2016.01) |
| *H01M 8/04701* | (2016.01) |
| *B60L 50/72* | (2019.01) |
| *H01M 8/02* | (2016.01) |

(52) U.S. Cl.
CPC ......... *H01M 8/04768* (2013.01); *B60L 50/72* (2019.02); *H01M 8/02* (2013.01); *H01M 8/04029* (2013.01); *H01M 8/04701* (2013.01); *B60Y 2400/202* (2013.01); *H01M 2250/20* (2013.01)

(58) Field of Classification Search
CPC ........... H01M 8/0476; H01M 8/04029; H01M 8/04701; H01M 8/02; H01M 2250/20; H01M 8/2475; H01M 8/2465; B60L 50/72; B60L 3/0007; B60Y 2400/202; Y02E 60/50; Y02T 90/14; Y02T 10/7072; Y02T 10/70; Y02T 90/40
See application file for complete search history.

(56) References Cited

U.S. PATENT DOCUMENTS

| | | | | |
|---|---|---|---|---|
| 8,415,060 | B2 * | 4/2013 | Fukuma | H01M 8/04089 429/413 |
| 2017/0101031 | A1 * | 4/2017 | Ohashi | B60L 50/72 |

FOREIGN PATENT DOCUMENTS

| | | |
|---|---|---|
| JP | 2013-247083 A | 12/2013 |
| JP | 2016-115474 A | 6/2016 |

* cited by examiner

*Primary Examiner* — Ula C Ruddock
*Assistant Examiner* — Sarika Gupta
(74) *Attorney, Agent, or Firm* — Sughrue Mion, PLLC

(57) ABSTRACT

A fuel cell system and a fuel cell vehicle that prevent deformation of a fuel cell case when an external force is applied are provided. A fuel cell system includes a fuel cell case configured to contain a fuel cell; and an auxiliary device fixed to a side surface of the fuel cell case. The auxiliary device includes: a first support part fixed to the fuel cell case; a second support part fixed to the fuel cell case at a position spaced apart from the first support part; and a main body part supported by the first support part and the second support part spaced apart from the fuel cell case. The first support part is broken before the second support part is broken when an external force is applied to the main body part in a direction approaching the fuel cell case.

9 Claims, 12 Drawing Sheets

FUEL CELL SYSTEM AND FUEL CELL VEHICLE

CROSS REFERENCE TO RELATED APPLICATIONS

This application is based upon and claims the benefit of priority from Japanese patent application No. 2018-116335, filed on Jun. 19, 2018, the disclosure of which is incorporated herein in its entirety by reference.

BACKGROUND

The present disclosure relates to a fuel cell system and a fuel cell vehicle.

Recently, placement of a system constituting a fuel cell vehicle has been studied in the development of fuel cell vehicles.

Japanese Unexamined Patent Application Publication No. 2013-247083 discloses as follows regarding a fuel cell system including an auxiliary device case disposed at one end side of a fuel cell stack in a stacking direction which stores auxiliary devices therein and a boost converter that boosts an output voltage of the fuel cell stack and outputs electric power. Specifically, in the fuel cell system, the boost converter is disposed at an approximate center of the whole shape of the fuel cell system including the fuel cell stack and the auxiliary device case in the stacking direction, and is also disposed at a position adjacent to one side surface of the fuel cell stack.

SUMMARY

It is important to reduce the possibility that hydrogen gas may leak due to, for example, an accident in a fuel cell vehicle that uses hydrogen gas. To that end, a structure that effectively prevents deformation of a fuel cell case is required in order to prevent a unit cell from breaking even when an external force is applied to the fuel cell system due to an accident or the like. However, when a fuel cell vehicle incorporating an arrangement described in Japanese Unexamined Patent Application Publication No. 2013-247083 receives an impact from the outside, the impact is transmitted from the boost converter to the fuel cell stack. In this case, the unit cell in the stack case may be broken by the impact received from the boost converter. That is, the fuel cell vehicle has a problem in the structure of the fuel cell stack and the auxiliary device disposed adjacent to one side surface of the fuel cell stack.

The present disclosure has been made to solve such a problem. An object of the present disclosure is to provide a fuel cell system and a fuel cell vehicle that effectively prevent deformation of a fuel cell case when an external force is applied thereto.

An example aspect is a fuel cell system including: a fuel cell case configured to contain a fuel cell; and an auxiliary device fixed to a side surface of the fuel cell case. The auxiliary device includes: a first support part fixed to the fuel cell case; a second support part fixed to the fuel cell case at a position spaced apart from the first support part; and a main body part supported by the first support part and the second support part spaced apart from the fuel cell case. The first support part is broken before the second support part is broken when an external force is applied to the main body part in a direction approaching the fuel cell case.

Then, when an impact received from the outside is transmitted to the auxiliary device, the first support part is broken first. It is thus possible to effectively prevent direct deformation of the fuel cell case.

In the above fuel cell system, the main body part is preferably spaced apart from the fuel cell case and includes an abutting part which abuts against the fuel cell case when the first support part is broken by the external force, the fuel cell case preferably includes a contact part that is brought into contact with the abutting part when the first support part is broken by the external force, and the contact part is preferably provided at a position closer to an edge part of the side surface than a center part of the side surface. Since the fuel cell case is brought into contact with the abutting part at a part having relatively high rigidity, it is possible to reduce the damage to the fuel cell contained in the fuel cell case.

Further, the abutting part is provided at a position closer to the first support part than the second support part. Such a configuration enables the abutting part to satisfactorily abut against the fuel cell case after the first support part is broken.

In the above fuel cell system, the first support part and the abutting part may be disposed along a ridgeline formed by the side surface and an upper surface of the fuel cell case. Such a configuration enables the first support part and the abutting part to be disposed at positions of the fuel cell case having relatively high rigidity.

In the above fuel cell system, the contact part is preferably formed in a rib shape along the ridgeline. Such a configuration can relatively improve the rigidity of the contact part.

In the above fuel cell system, the auxiliary device is fixed in such a way that the first support part thereof is fixed to the side surface at a position above a center part of the side surface, and the second support part is fixed to the side surface at a position below the center part of the side surface. Such a configuration enables the auxiliary device to be fixed to a position of the fuel cell case having relatively high rigidity.

In the above fuel cell system, the auxiliary device may be a valve for controlling cooling water for cooling the fuel cell, and the abutting part may a pressure adjusting part for adjusting an internal pressure of the main body part. Since the pressure adjusting part of the valve has relatively high rigidity and protrudes from the surroundings, it is possible to effectively prevent the deformation of the fuel cell case without separately setting the abutting part.

In the above fuel cell system, the first support part may include a break induction part configured to receive stress concentration when the first support part is broken by the external force. Then, the first support part can be satisfactorily broken.

The second support part may include a connection part extending in a direction orthogonal to the side surface and connecting the main body part to the fuel cell case. Then, the abutting part can be satisfactorily made abut against the fuel cell case after the first support part is broken.

Another example aspect is a fuel cell vehicle on which any one of the above fuel cell systems is mounted. The fuel cell system is disposed in such a way that the side surface becomes parallel to a side surface of the fuel cell vehicle. Thus, it is possible to provide a fuel cell vehicle that reduces damage to the fuel cell when it receives a side collision.

According to the present disclosure, it is possible to provide a fuel cell system and a fuel cell vehicle that effectively prevent deformation of a fuel cell case when an external force is applied thereto.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Hereinafter, although the present disclosure will be described with reference to embodiments of the present disclosure, the present disclosure according to claims is not limited to the following embodiments. Moreover, all the components described in the following embodiment are not necessarily indispensable for means to solve problems.

Figure 1:
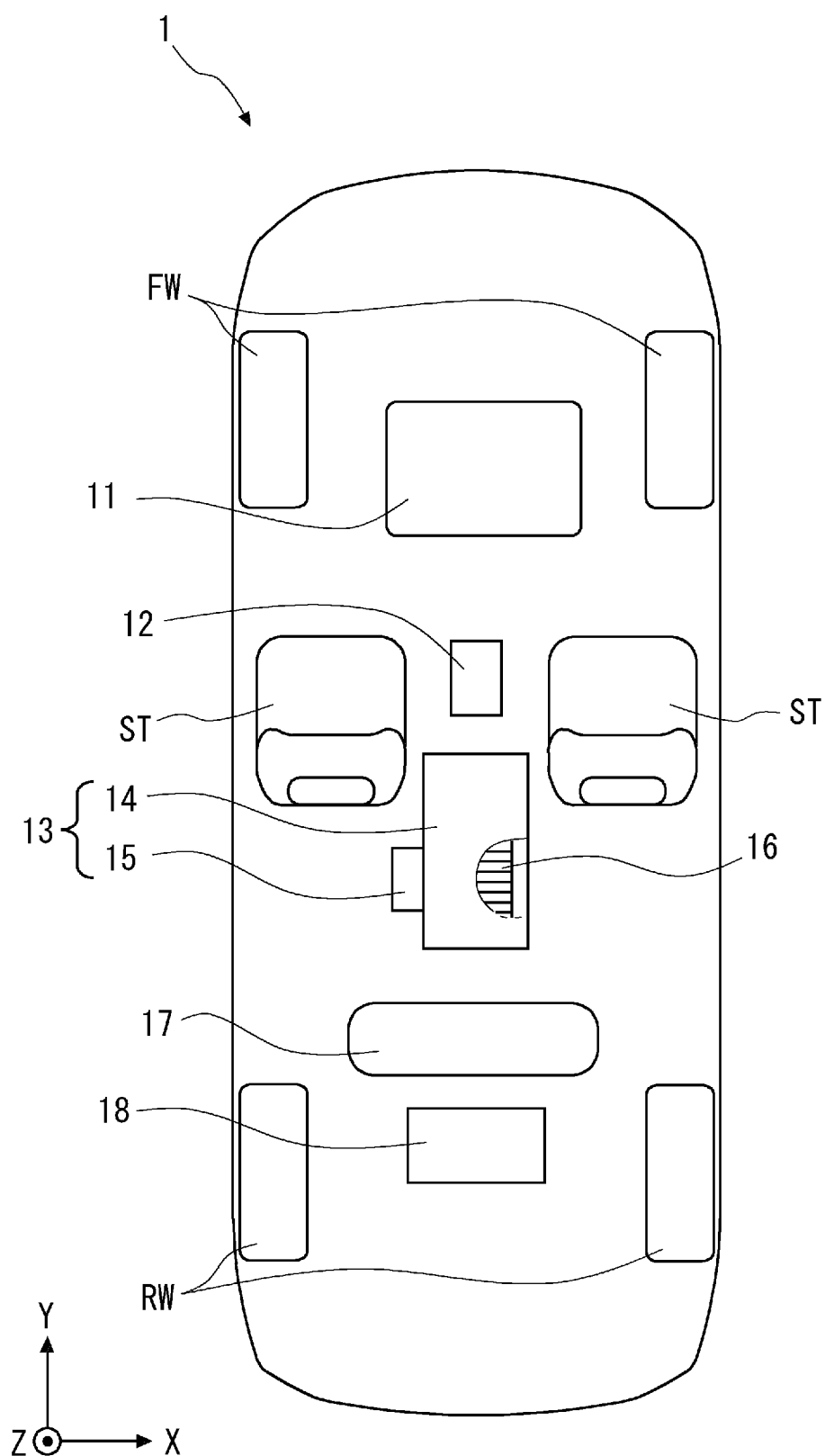
FIG. 1 is an explanatory view of an internal configuration of a fuel cell vehicle viewed in a plane.

First, a configuration of a fuel cell vehicle with a fuel cell system mounted thereon according to an embodiment of the present disclosure will be described with reference to FIG. 1. FIG. 1 is a view for explaining an overview of an internal configuration of the fuel cell vehicle. The fuel cell vehicle 1 is an automobile that generates electricity by causing a chemical reaction between hydrogen and oxygen, and drives a motor with the generated electricity to travel.

The fuel cell vehicle 1 mainly includes a vehicle drive system 11, a boost inverter 12, a fuel cell system 13, a hydrogen tank 17, and a battery 18. In the following drawings, right-handed XYZ coordinates for describing a positional relationship of components are provided. In the drawings, an XY plane is a horizontal plane, and a Z-axis is a vertical direction. Further, the X-axis positive direction indicates the right direction of the fuel cell vehicle 1, and the Y-axis positive direction indicates the front side of the fuel cell vehicle 1.

A vehicle drive system 11 is disposed on the front side of the fuel cell vehicle 1 and plays a role of driving the vehicle. The main function of the vehicle drive system 11 is to receive a current supplied from a boost inverter 12 and drive an AC motor for rotating wheels FW. Further, the vehicle drive system 11 collects electricity at the time of deceleration and supplies it to the battery 18.

The boost inverter 12 is disposed on the rear side of the vehicle drive system 11 and plays a role of boosting a voltage of the electricity generated by the fuel cell system 13 and supplying it to the vehicle drive system 11.

The fuel cell system 13 generates electricity by causing an electrochemical reaction between hydrogen received from the hydrogen tank 17 and oxygen in the air, and supplies the generated current to the boost inverter 12. The fuel cell system 13 is disposed behind the boost inverter 12 and at a lower part of seats ST. The fuel cell system 13 includes a fuel cell stack 14 and a valve apparatus 15. In the drawing, a part of the fuel cell stack 14 is shown transparent for convenience of explanation.

As shown in the drawing, the fuel cell stack 14 contains a fuel cell 16 in which a plurality of unit cells are stacked in a Y-axis direction. The fuel cell 16 generates electricity and water by causing an electrochemical reaction between hydrogen gas and air.

The valve apparatus 15 is an auxiliary device of the fuel cell system 13 disposed on the left side surface (a YZ surface) of the fuel cell stack 14. The valve apparatus 15 is a rotary valve, and has a function of adjusting a flow rate ratio of an amount of cooling water circulating between a radiator (not shown) and the fuel cell stack 14 that passes through the radiator to an amount of cooling water circulating between the radiator and the fuel cell stack 14 that is bypassed without passing through the radiator.

The hydrogen tank 17 is disposed behind the fuel cell system 13 and stores hydrogen. The hydrogen tank 17 supplies the stored hydrogen gas to the fuel cell system 13. The battery 18 is disposed behind the hydrogen tank 17. The battery 18 stores the electricity collected by the vehicle drive system 11 and supplies the stored electricity to the vehicle drive system 11 as necessary.

Figure 2:
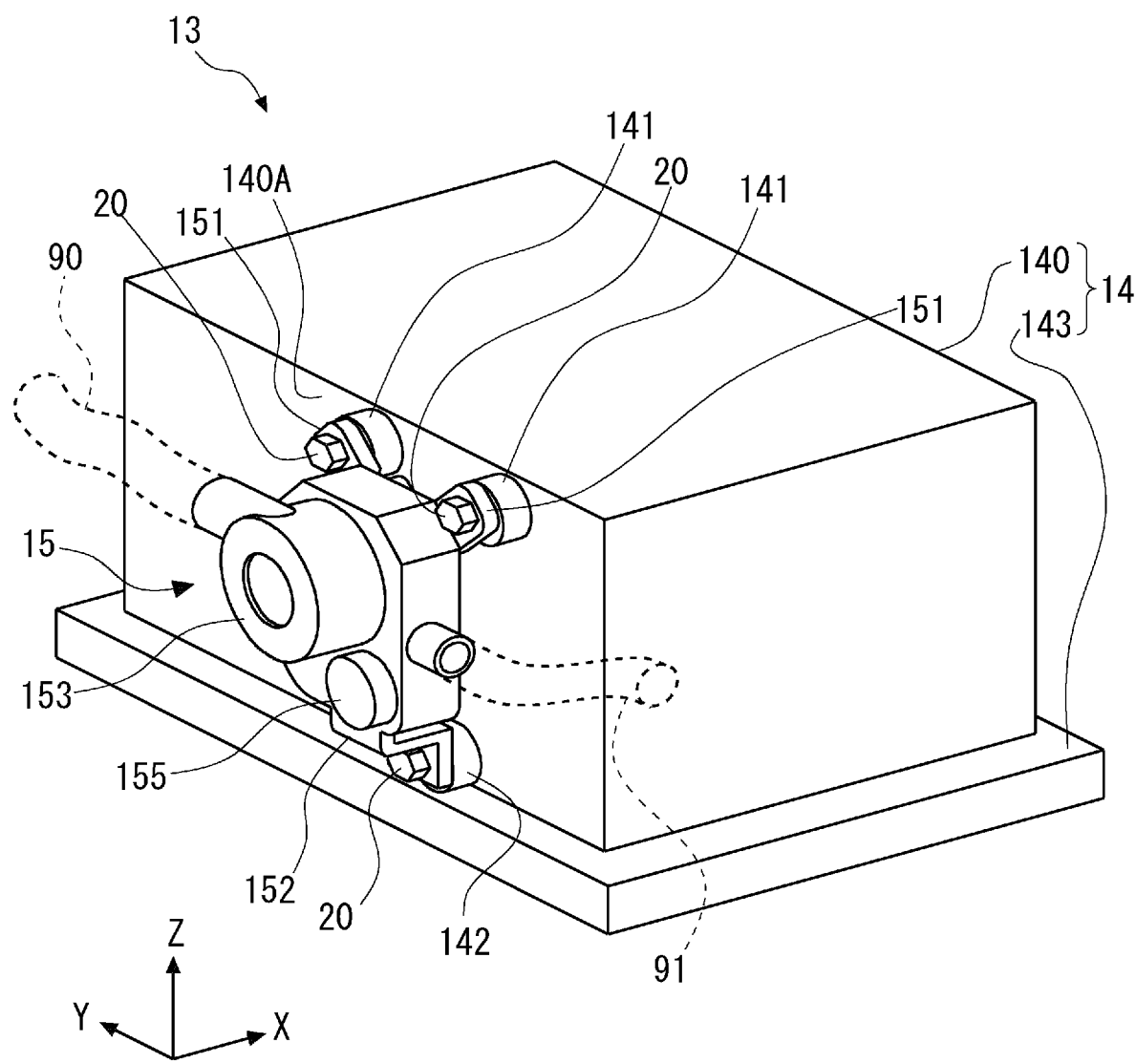
FIG. 2 is an external perspective view of a fuel cell system according to a first embodiment.
Figure 3:
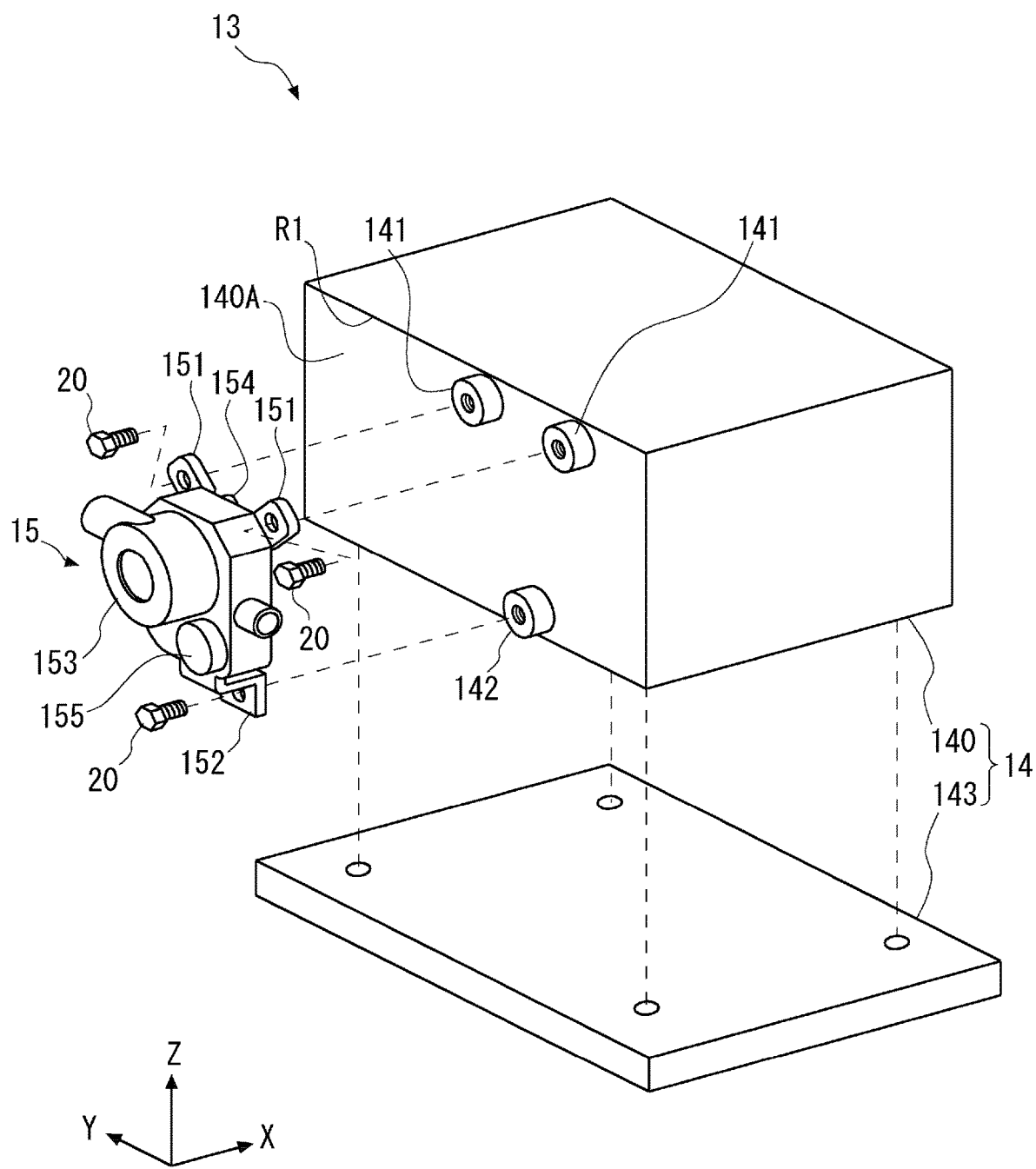
FIG. 3 is an exploded perspective view of the fuel cell system according to the first embodiment.

Next, the fuel cell system will be described in detail with reference to FIGS. 2 and 3. FIG. 2 is an external perspective view of the fuel cell system according to the first embodiment. FIG. 3 is an exploded perspective view of the fuel cell system according to the first embodiment.

As shown in the drawings, the fuel cell stack 14 includes a case 140 and a frame 143. The case 140 and the frame 143 are screwed to each other with bolts (not shown). Further, the frame 143 is screwed to a chassis of the fuel cell vehicle 1 with bolts (not shown). In this manner, the fuel cell system 13 is fixed to the fuel cell vehicle 1.

A side surface of the case 140 on an X-axis negative side is a fixing surface 140A for fixing the valve apparatus 15. On the fixing surface 140A, two first bosses 141 stand along a ridgeline R1 formed by the fixing surface 140 and an upper surface of the case 140. Further, a second boss 142 is stand on a lower part of the fixing surface 140A and spaced apart from the first bosses 141. Screw holes are formed in top parts of the first bosses 141 and the second boss 142, and bolts 20 are screwed therein. First support parts 151 of the valve apparatus 15 are screwed into the respective first bosses 141. A second support part 152 of the valve apparatus 15 is screwed into the second boss 142. The first bosses 141 provided at positions above a center part of the side surface of the fixing surface 140A and the second boss 142 provided below the center part of the side surface of the fixing surface 140A enable the valve apparatus 15 to be fixed to a relatively high rigid area.

The valve apparatus 15 is composed of a main body part 153, the two first support parts 151, and the second support part 152. The main body part 153 includes an inlet port connected to a pipe 90 for receiving the cooling water, an outlet port for supplying the cooling water to a pipe 91, a rotor for adjusting a flow rate, a rotor drive motor 155, and so on. Note that the rotor drive motor 155 is provided on the side where the second support part 152 is extended. In other words, the second support part 152 is extended from the vicinity of the rotor drive motor 155.

A breather cap 154 for internal pressure adjustment stands in an upper part of the main body part 153 at a position facing the case 140 and closer to the first support parts 151 than the second support part 152. The breather cap 154 is spaced apart from the fixing surface 140A and configured to abut against the case 140 when the first support part 151 is broken, which will be described later. The breather cap 154 may be referred to as a breather valve.

The two first support parts 151 are extended outward along a YZ plane from positions spaced apart from each other where the breather cap 154 is sandwiched therebetween in the upper part of the main body part 153. Each of the first support parts 151 includes a through hole for inserting the bolt 20. The first support parts 151 are disposed at positions corresponding to the respective two first bosses 141, and are fixed to the case 140 with the respective bolts 20. The first support parts 151 and the breather cap 154 are arranged along the ridgeline R1 formed by the side surface and the upper surface of the fuel cell stack 14.

The second support part 152 is extended from the lower part of the main body part 153 spaced apart from the first support parts toward the Z-axis negative side, is bent towards the X-axis positive side, and then again is extended in the Z-axis negative side where a through hole for inserting the bolt 20 is provided. The second support part 152 is disposed at a position corresponding to the second boss 142 and is fixed to the case with the bolt 20.

Figure 4:
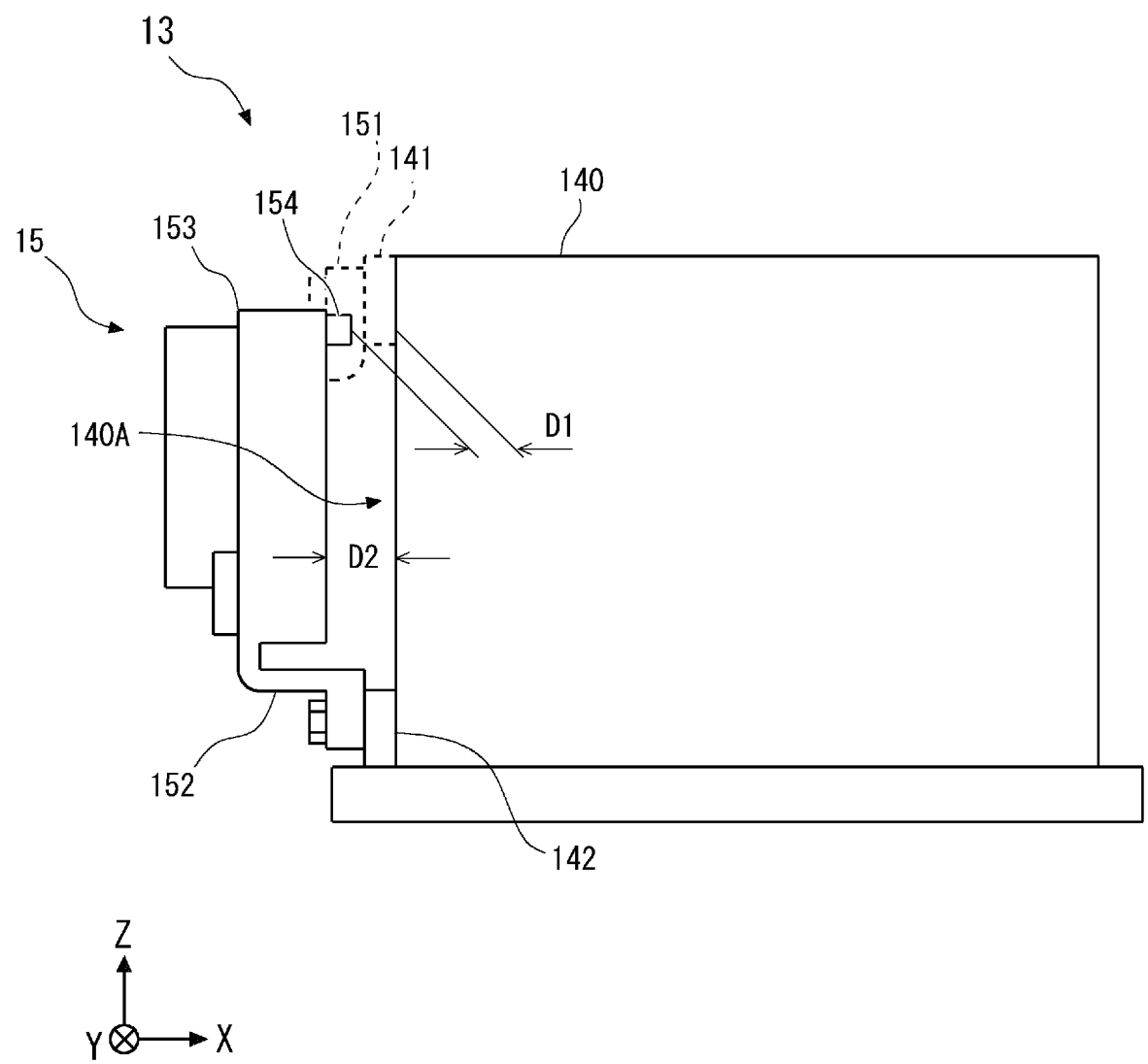
FIG. 4 is a rear view of the fuel cell system according to the first embodiment.

Next, the positional relationship between the fuel cell stack 14 and the valve apparatus 15 will be further described with reference to FIG. 4. FIG. 4 is a rear view of the fuel cell system according to the first embodiment. For easier understanding, the first support parts 151 and the first bosses 141 are shown by dotted lines.

As shown in the drawing, the valve apparatus 15 is fixed to the fixing surface 140A by screwing the first support parts 151 into the first bosses 141 and screwing the second support part 152 into the second boss 142. That is, the main body part 153 is supported by the first support part 151 and the second support part 152 while being spaced apart from the case 140. A distance between the main body part 153 and the case 140 (the fixing surface 140A) is D2. On the other hand, the breather cap 154 projecting from the main body part 153 toward the case 140 side is also spaced apart from the case 140 (the fixing surface 140A), and a distance between the breather cap 154 and the case 140 is D1 which is smaller than D2.

Figure 5:
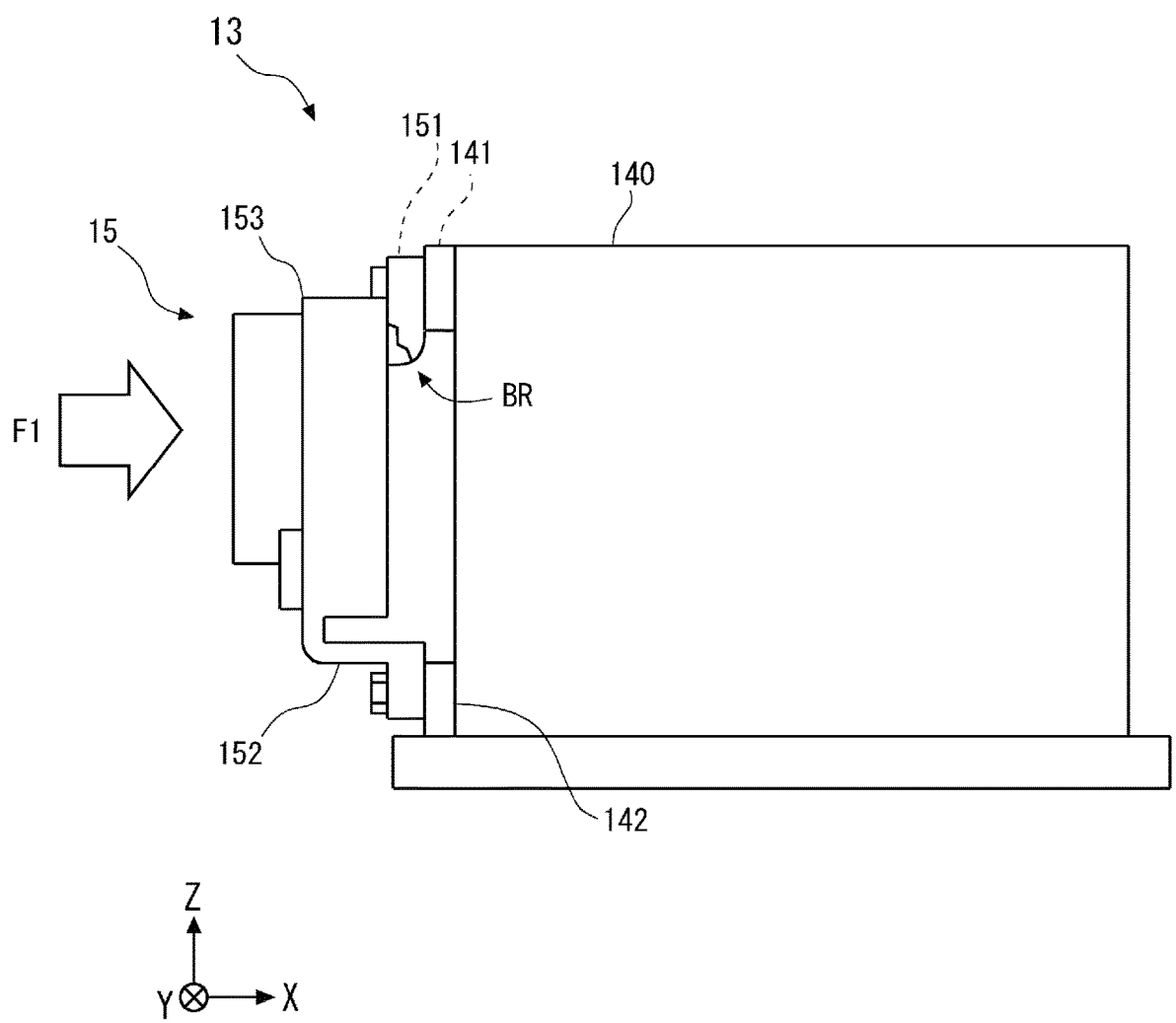
FIG. 5 is a view for explaining a state in which a crack is generated in a first support part of a valve apparatus by an external force.

Next, a state in which the valve apparatus 15 is broken by an external force will be described. FIG. 5 is a view for explaining a state in which a crack is generated in the first support part of the valve apparatus by an external force. An external force F1 is a pressing force generated when some object collides from the outside of the fuel cell vehicle 1. The external force F1 works to bring the main body part 153 of the valve apparatus 15 closer to the case 140 side from the X-axis negative side toward the X-axis positive direction.

When the external force F1 is applied to the main body part 153, component forces of the external force F1 are transmitted to the first support parts 151 and the second support part 152, respectively. The first support parts 151 are configured in advance that they break before the second support part when the external force F1 is applied to the main body part 153. For this reason, when the component forces of the external force F1 are applied to the first support parts 151 exceeding the yield stress, a crack BR is generated in the first support part 151.

Figure 6:
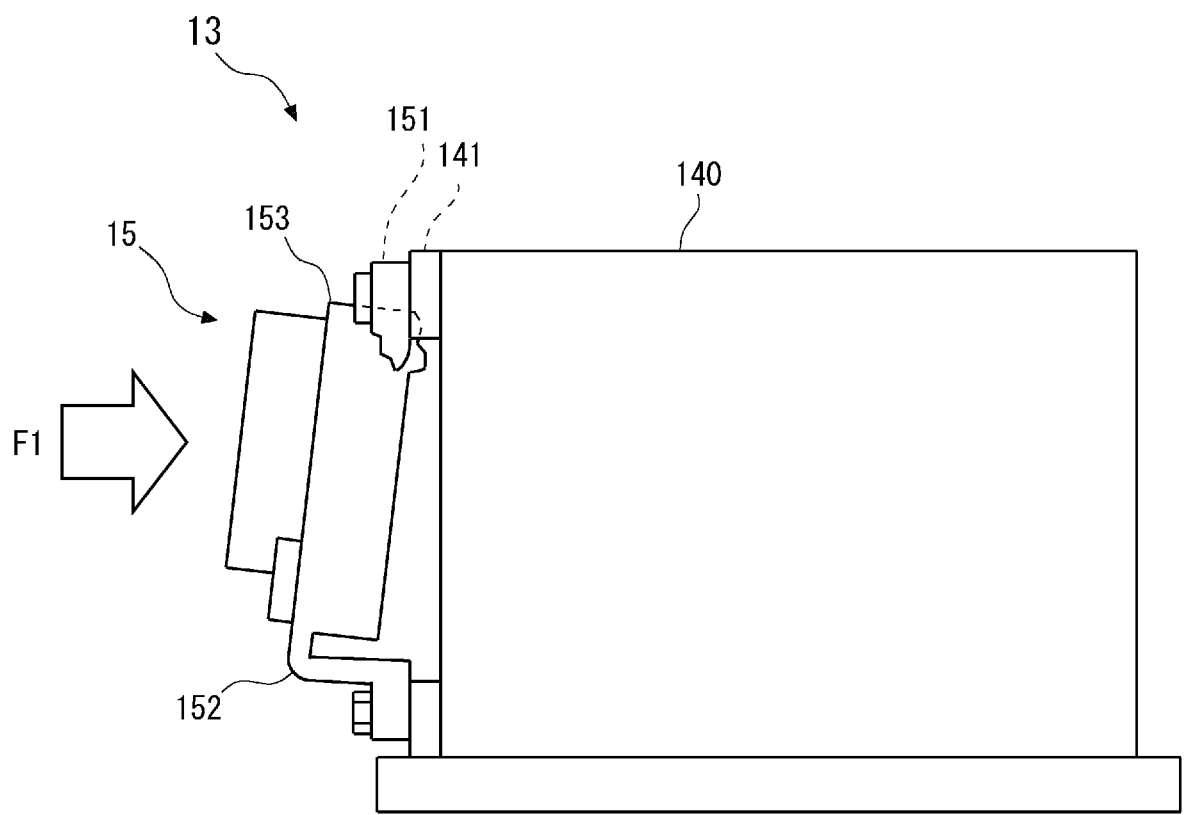
FIG. 6 is a view showing a state in which an external force is applied to an auxiliary device, and the support part is broken.
Figure 7:
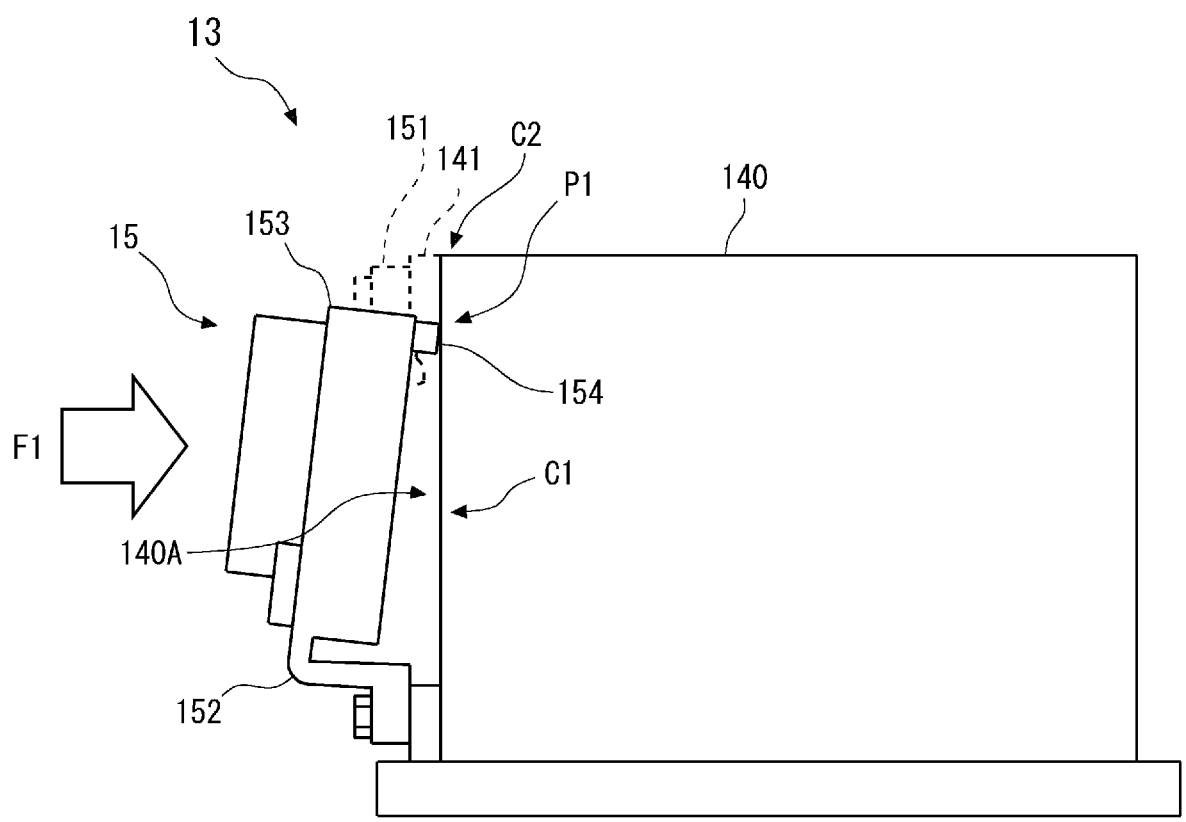
FIG. 7 is a view showing a state in which an external force is applied to the auxiliary device, and an abutting part is brought into contact with a fuel cell case.
Figure 7:
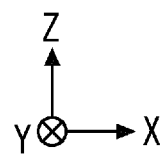

FIGS. 6 and 7 show a state in which the external force F1 is applied to the valve apparatus 15, and the first support part 151 is broken. The state of the first support parts 151 and the state of the breather cap 154 are shown in separate drawings in FIGS. 6 and 7 for the convenience of explanation. FIG. 6 is a view showing a state in which the valve apparatus 15 serving as the auxiliary device receives the external force, and the support part is broken. FIG. 7 is a view showing a state in which the valve apparatus 15 serving as the auxiliary device receives the external force, and an abutting part abuts against the fuel cell case.

As shown in the drawings, after the crack is generated, the first support part 151 is broken. When the external force F1 continues to be applied after the first support part 151 is broken, the second support part 152 is deformed, and the upper part of the main body part 153 moves to approach the case 140. Then, the breather cap 154 projecting from the main body part 153 abuts against a contact part P1 of the case 140. In this case, the deformation of the second support part 152 may be elastic deformation or plastic deformation.

As described above, the preset breather cap 154 abuts against the contact part P1 of the case 140, which prevents parts of the main body part 153 other than the breather cap 154 from being brought into contact with the case 140. With such a configuration, the fuel cell system 13 can effectively prevent unintentional breakage of the fuel cell.

The rigidity of the contact part P1 is preferably high in order to effectively prevent the deformation of the case 140. As shown in FIG. 7, the contact part P1 is provided at a position closer to an edge part C2 than a center part C1 of the fixing surface 140A. Such a configuration can relatively increase the rigidity of the contact part P1. The thickness of the contact part P1 of the case 140 may be increased in order to relatively increase the rigidity of the contact part P1. Alternatively, the rigidity of the contact part P1 may be increased by adding another reinforcing member to the case 140.

Next, variations of shapes of the first support parts 151 and the second support part 152 will be described. When the external force F1 is applied to the main body part 153, the first support parts 151 are configured to break before the second support part 152. A specific configuration example for achieving this will be described below.

Figure 8:
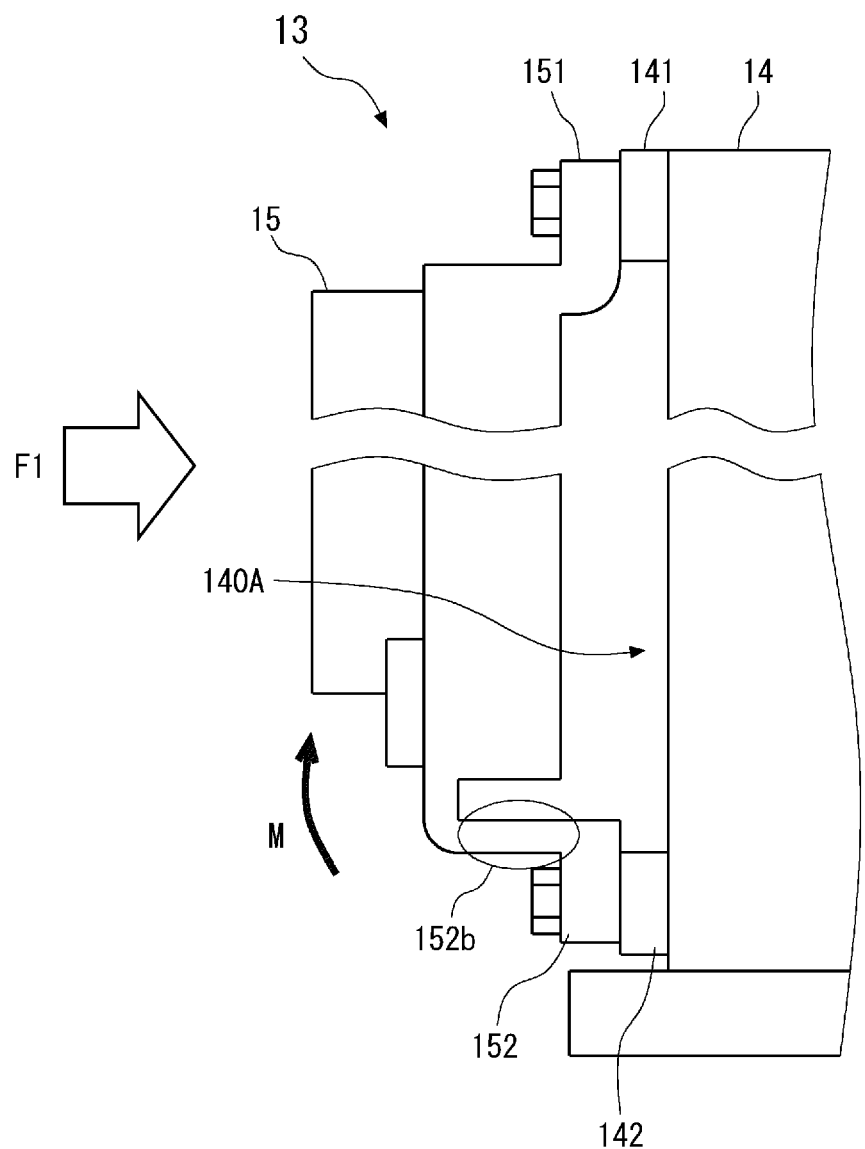
FIG. 8 is a view for explaining shapes of the support parts.

FIG. 8 is a view for explaining the shapes of the support parts. FIG. 8 shows a part of the fuel cell system 13 cut out to show the shapes of the first support parts 151 and the second support part 152. As shown in the drawing, the second support part 152 includes a connection part 152*b* that connects the case 140 to the main body part 153. The connection part 152*b* is extended in a direction orthogonal to the fixing surface 140A.

The connection part 152*b* included in the second support part 152 causes a moment of force M to be generated in the main body part 153, because after the first support part 151 is broken, the connection part 152*b* is deformed. This makes it easier for the fuel cell system 13 to set the position of the contact part P1.

Figure 9:
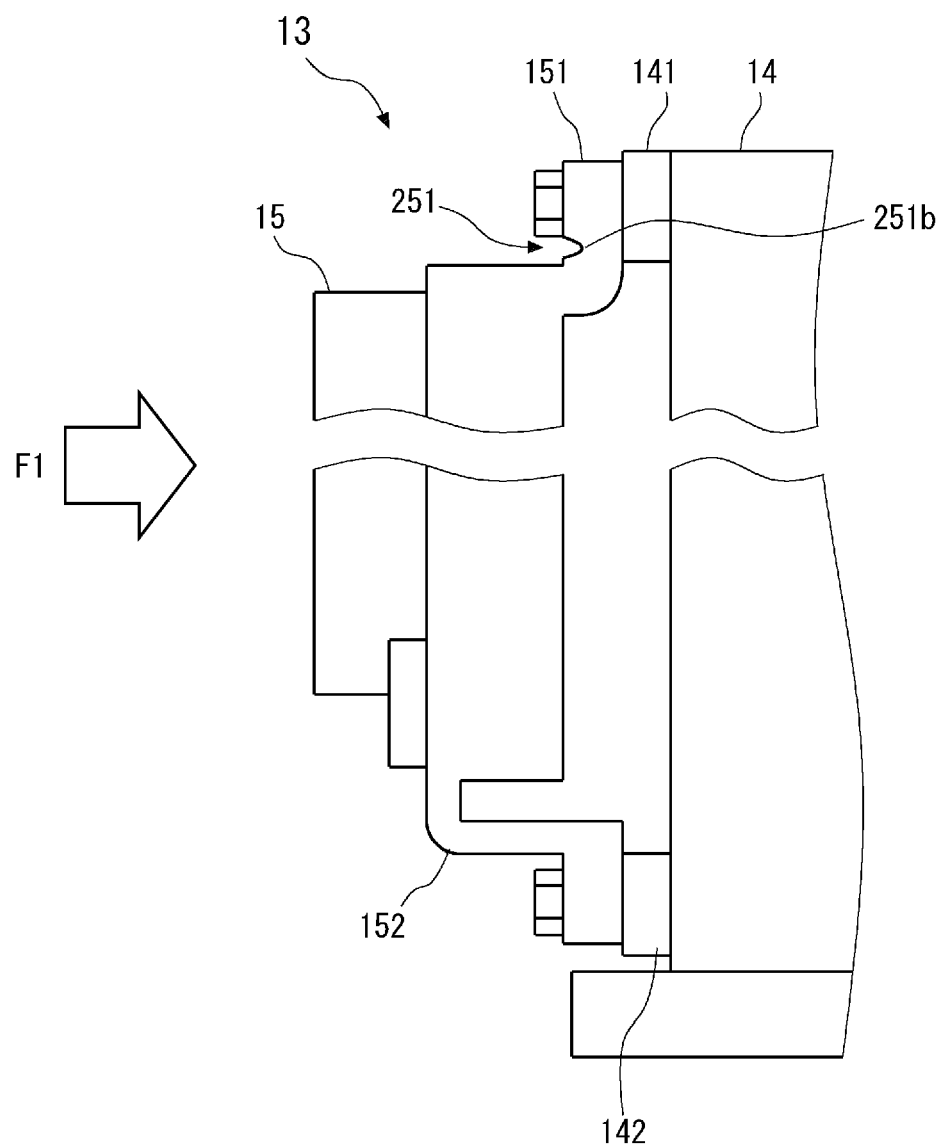
FIG. 9 is a view showing another example of the shapes of the support parts.

FIG. 9 is a view showing another example of the shapes of the support parts. A fuel cell system 13 shown in FIG. 9 differs from the fuel cell system 13 in FIG. 8 in that, in the fuel cell system 13 of FIG. 9, the first support part 151 includes a break induction part 251. The break induction part 251 is a U-shaped or V-shaped groove provided in an area where the case 140 is connected to the main body part 153 in the first support part 151.

When the external force F1 is applied to the valve apparatus 15, stress is concentrated on a bottom part 251b of the break induction part 251. Then, when the first support part 151 is broken, a crack is generated in the bottom part 251b. Such a configuration makes it easy for the fuel cell system 13 to control a break position of the first support part 151.

Figure 10:
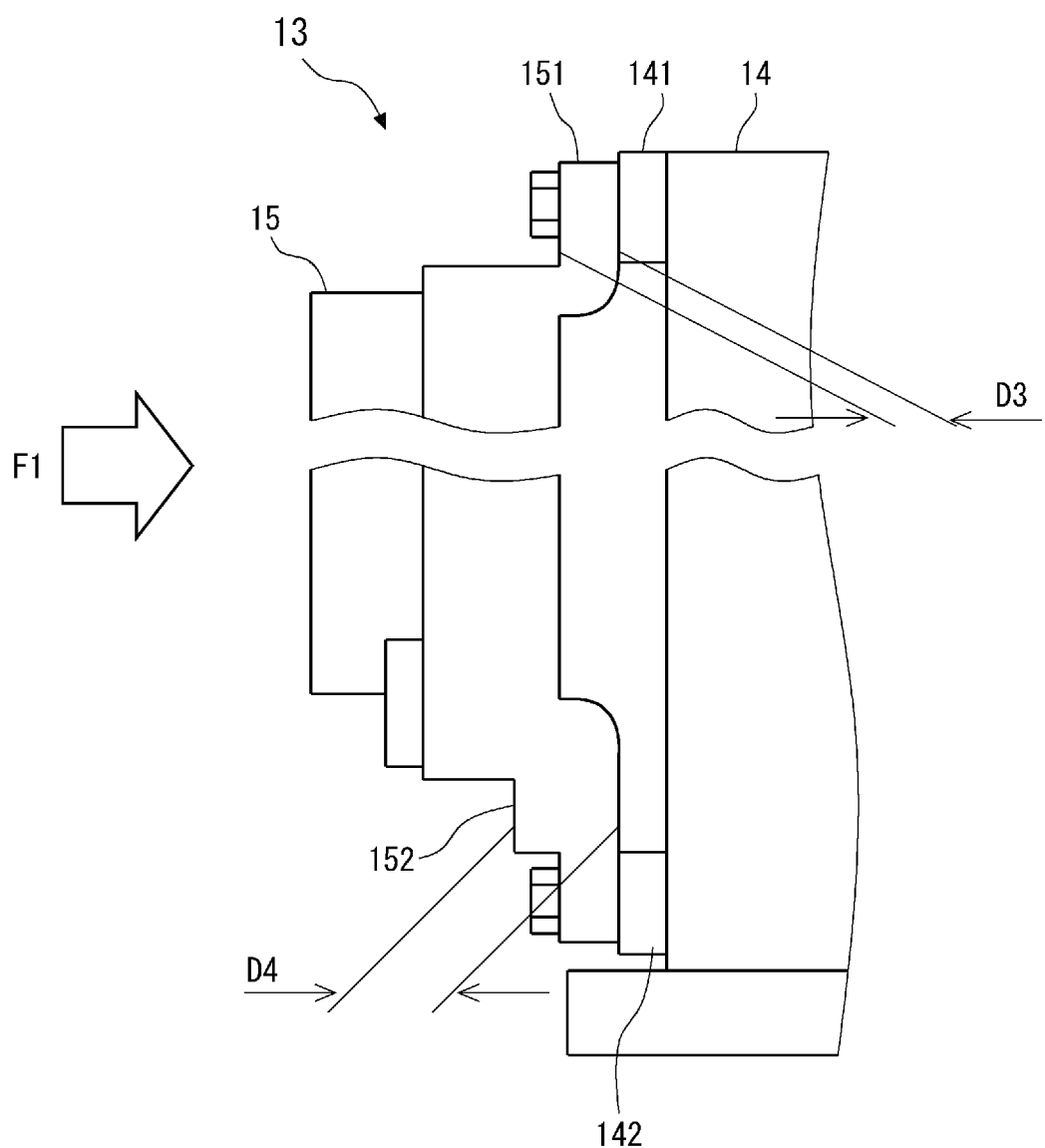
FIG. 10 is a view showing still another example of the shapes of the support parts.

FIG. 10 is a view showing still another example of the shapes of the support parts. In the fuel cell system 13 shown in FIG. 10, the second support part 152 does not include the connection part 152b, and the dimension of the support part in the thickness direction differs from that in the example in FIG. 8. As shown in the drawing, the dimension of the first support part 151 in the thickness direction is D3. Further, the dimension of the second support part 152 in the thickness direction is D4 which is larger than D3. Since the dimension of the second support part 152 in the thickness direction is D4 which is larger than D3, the rigidity of the second support part 152 in the shear direction is higher than the rigidity of the first support parts 151 in the shear direction. Such a configuration makes it easy for the fuel cell system 13 to satisfactorily make the first support part 151 break when the external force F1 is applied to the valve apparatus 15.

Note that the rigidity of the second support part 152 in the shear direction can be made higher than the rigidity of the first support parts 151 in the shear direction by making the dimension of the second support part 152 in the width direction wider than the dimension of the first support parts 151 in the width direction instead of setting the dimension of the second support part 152 in the thickness direction in the manner described above. That is, in the example of FIG. 10, the second moment of area of the second support part 152 in the shear direction is set so that it becomes larger than the second moment of area of the first support parts 151 in the shear direction. Then, the rigidity of the second support part 152 in the shear direction can be made higher than the rigidity of the first support parts 151 in the shear direction.

Although the first embodiment has been described above, the fuel cell system 13 according to the first embodiment is not limited to the configuration described above. For example, the first support parts 151 of the valve apparatus 15 may be positioned at positions below the center part of the fixing surface 140A and in the vicinity of the frame 143, and the second support part 152 may be positioned at positions above the center part of the fixing surface 140A and in the vicinity of the ridgeline formed by the fixing surface 140A and the upper surface of the case 140. In this case, the breather cap 154 which is the abutting part is positioned in the vicinity of the first support parts 151. With such a configuration, the contact part P1 that is brought into contact with the breather cap 154 is set near the frame 143. Thus, the fuel cell system 13 can receive the pressing force caused by the external force F1 at a position having high rigidity, and it is possible to effectively prevent the contained fuel cell from breaking.

Moreover, the valve apparatus 15 may be configured to include one first support part 151 and two second support parts 152. Further, the auxiliary device fixed to the fixing surface 140A may be another type of an auxiliary device in place of the valve apparatus 15. The abutting part included in the main body part 153 may not be the breather cap 154 as long as it is a part of the main body part 153 and instead may be another configuration which is spaced apart from the case 140 abuts against the case 140 when the first support part 151 is broken by the external force F1.

Second Embodiment

Next, a second embodiment will be described. A fuel cell system according to the second embodiment differs from the fuel cell system according to the first embodiment in that in the fuel cell system according to the second embodiment, a case includes a rib for fixing the first support parts 151.

Figure 11:
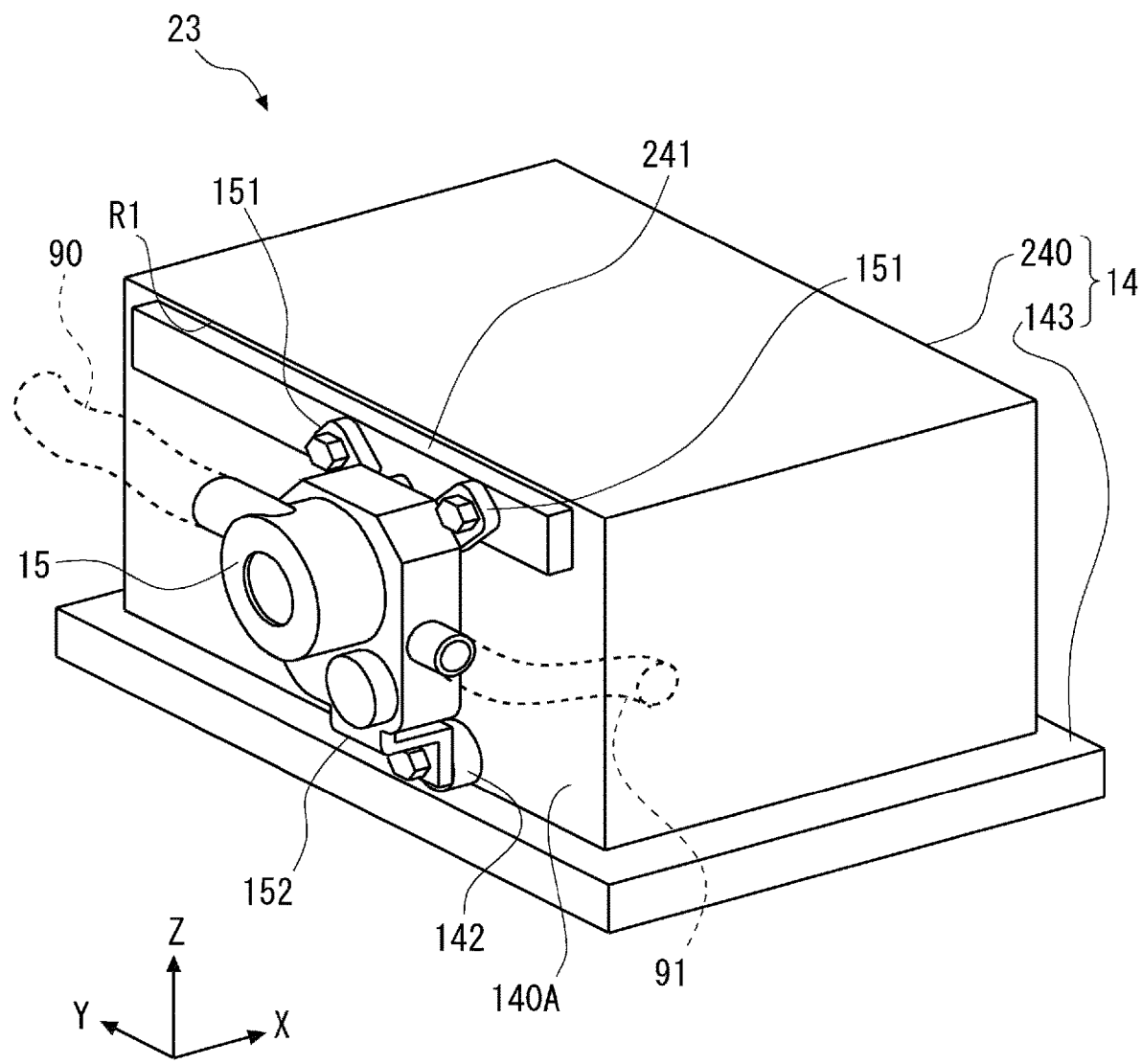
FIG. 11 is an external perspective view of a fuel cell system according to a second embodiment.

FIG. 11 is an external perspective view of the fuel cell system according to the second embodiment. A fuel cell system 23 shown in FIG. 11 includes a case 240 in place of the case 140 of the fuel cell system 13. The case 240 includes a rib 241 along a ridgeline R1 (parallel to the Y-axis) formed by a fixing surface 140A and an upper surface of the case 240 on an upper side of the fixing surface 140A. The rib 241 included in the case 240 enables the fuel cell system 13 to increase the rigidity of the case 240. The rib 241 includes screw holes for screwing the first support parts 151 of the valve apparatus 15. By fixing the first support parts 151 to the rib 241, the fuel cell system 13 can effectively prevent the deformation of the case 240 when the external force F1 is applied thereto.

Figure 12:
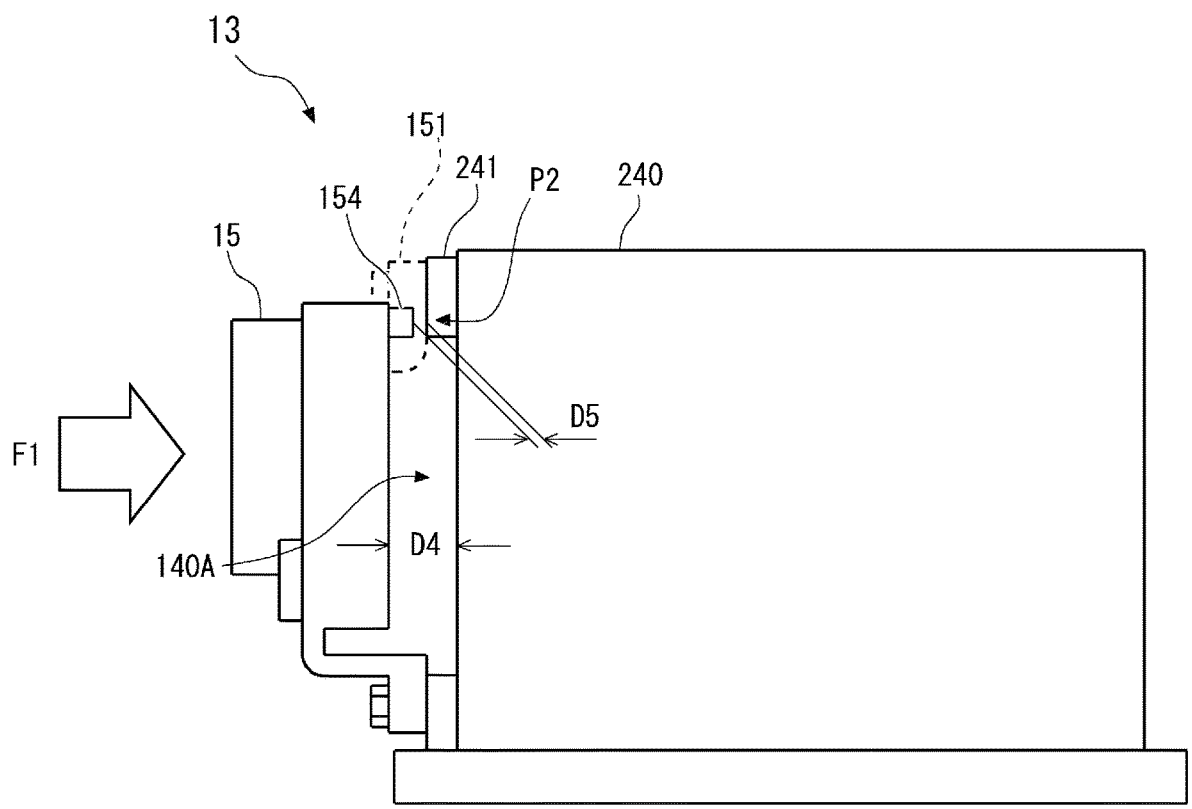
FIG. 12 is a rear view of the fuel cell system according to the second embodiment.
Figure 12:
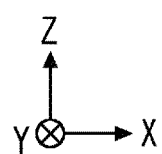

Next, the positional relationship between the fuel cell stack 14 and the valve apparatus 15 will be further described with reference to FIG. 12. FIG. 12 is a rear view of the fuel cell system according to the second embodiment. Note that like in FIG. 4, the first support parts 151 are indicated by dotted lines.

As shown in the drawing, the valve apparatus 15 is fixed to the fixing surface 140A by screwing the first support parts 151 to the rib 241 and screwing the second support part 152 into the second boss 142. A distance between the main body part 153 and the case 140 (the fixing surface 140A) is D4. On the other hand, a distance between the breather cap 154 and the case 140 (the rib 241) is D5 which is smaller than D4. The distance D5 between the breather cap 154 and the rib 241 is smaller than the distance D1 which is the distance between the breather cap 154 and the fixing surface 140A in the first embodiment. Such a configuration enables the main body part 153 to be brought closer to the case 240 side as compared with the case of the first embodiment. That is, D4 can be set smaller than D2.

In the case 240, a contact part P2 against which the breather cap 154 abuts is provided on the rib 241. That is, the contact part P2 is formed in a rib shape along the ridgeline R1 formed by the fixing surface 140A and the upper surface of the case 240. Such a configuration can relatively increase the rigidity of the contact part P2 in the fixing surface 140A. Thus, the fuel cell system 13 is configured to effectively prevent the deformation of the case 240 when the external force F1 is applied thereto, and the first support part 151 is broken.

Although the second embodiment has been described above, the configuration of the second embodiment is not limited to the one described above. For example, the rib 241 may have rib shapes separately for a part where the first support parts 151 are fixed and a part corresponding to the contact part P2.

Note that the present disclosure is not limited to the above-described embodiments, and can be appropriately changed without departing from the spirit of the present disclosure. For example, in the fuel cell vehicle shown in FIG. 1, the fuel cell system 13 is disposed under the floor at the center part of the vehicle. However, the present disclosure is not limited to this. For example, the fuel cell system 13 may be disposed in the front room of the vehicle.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell system comprising:
a fuel cell case configured to contain a fuel cell; and
an auxiliary device fixed to a side surface of the fuel cell case, wherein
the auxiliary device comprises:
  a first support part fixed to the fuel cell case;
  a second support part fixed to the fuel cell case at a position spaced apart from the first support part; and
  a main body part supported by the first support part and the second support part spaced apart from the fuel cell case, wherein
  the first support part extends outward from the main body part at a position above a center part of the side surface, the first support part being fixed to a boss or a rib that stands on the side surface, and
  the second support part extends downward from the main body part at a position below the center part of the side surface, further extends toward the side surface, and then further extends downward, the second support part being fixed to a boss or a rib that stands on the side surface.

2. The fuel cell system according to claim 1, wherein the main body part includes an abutting part and is spaced apart from the fuel cell case, the abutting part being configured to abut against the fuel cell case if the first support part is broken by the external force,
the fuel cell case includes a contact part that is configured to contact the abutting part if the first support part is broken by the external force, and
the contact part is provided at a position closer to an edge part of the side surface than a center part of the side surface.

3. The fuel cell system according to claim 2, wherein the abutting part is provided at a position closer to the first support part than the second support part.

4. The fuel cell system according to claim 2, wherein the first support part and the abutting part are disposed along a ridgeline formed by the side surface and an upper surface of the fuel cell case.

5. The fuel cell system according to claim 4, wherein the contact part is formed in a rib shape along the ridgeline.

6. The fuel cell system according to claim 2, wherein
the auxiliary device is a valve for controlling cooling water for cooling the fuel cell, and
the abutting part is a pressure adjusting part for adjusting an internal pressure of the main body part.

7. The fuel cell system according to claim 1, wherein the first support part comprises a break induction part configured to receive stress concentration when the first support part is broken by the external force.

8. The fuel cell system according to claim 1, wherein the second support part comprises a connection part extending in a direction orthogonal to the side surface and connecting the main body part to the fuel cell case.

9. A fuel cell vehicle on which the fuel cell system according to claim 1 is mounted, wherein
the fuel cell system is disposed in such a way that the side surface becomes parallel to a side surface of the fuel cell vehicle.

\* \* \* \* \*